C. H. WHEELER & J. A. BAZIN.

Assignors, by mesne assignments, to E. & H. T. ANTHONY & Co.

Stereoscope.

No. 8,218. Reissued May 7, 1878.

Witnesses
Chas H. Smith
Geo. T. Pinckney.

Inventors
Charles H. Wheeler.
James A. Bazin.
E & H. T. Anthony & Co assignees
per Lemuel W. Serrell. atty

UNITED STATES PATENT OFFICE.

CHARLES H. WHEELER, OF SAN FRANCISCO, CALIFORNIA, AND JAMES A. BAZIN, OF CANTON, MASSACHUSETTS, ASSIGNORS, BY MESNE ASSIGNMENTS, TO E. & H. T. ANTHONY & CO.

IMPROVEMENT IN STEREOSCOPES.

Specification forming part of Letters Patent No. 40,798, dated December 1, 1863; Reissue No. 8,218, dated May 7, 1878; application filed February 23, 1878.

*To all whom it may concern:*

Be it known that CHARLES H. WHEELER, formerly of West Roxbury, and JAMES A. BAZIN, of Canton, both in the county of Norfolk and State of Massachusetts, did invent an Improvement in Stereoscopes, of which the following is a specification:

In this stereoscope the picture-holder is movable upon a bed toward or from the lenses, and there is a sheet-metal connecting piece or clip between the bed and the picture-holder, to connect the parts, to allow the adjustment of the picture-holder, and to retain the same by friction after adjustment. The lens-holder is hinged, so as to be folded, and there is a movable field-piece or septum that can be adjusted to determine the field of vision and prevent the portion of the adjacent pictures being visible.

This stereoscope is open, and free from any inclosing-case; and it is constructed with reference to occupying but little space when folded for transportation, or when not in use.

Figure 2:
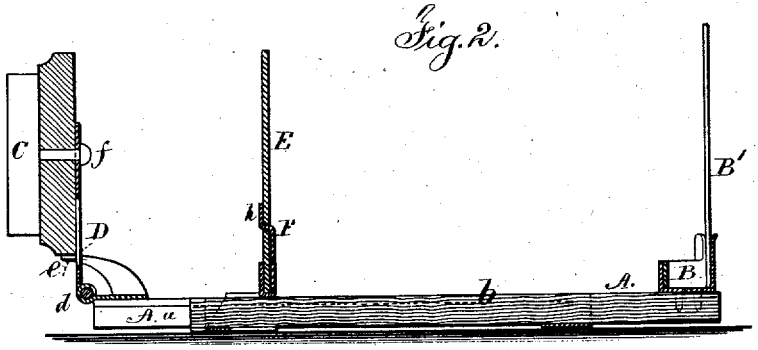
Figure 1:
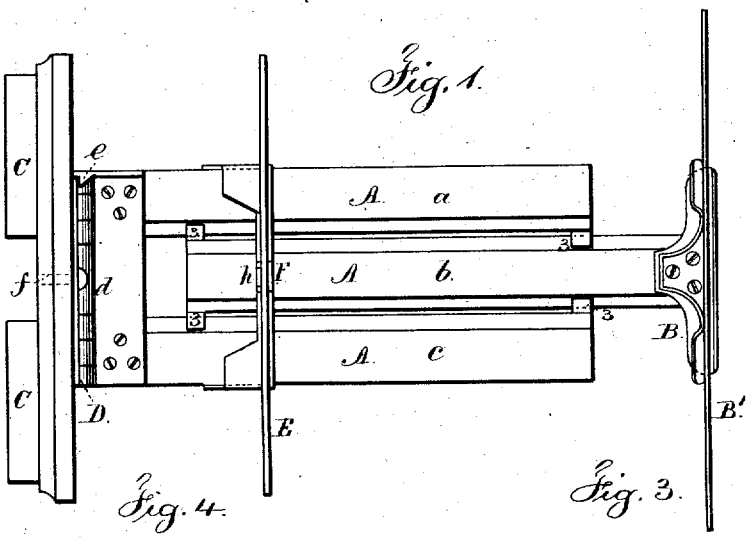
Figure 4:
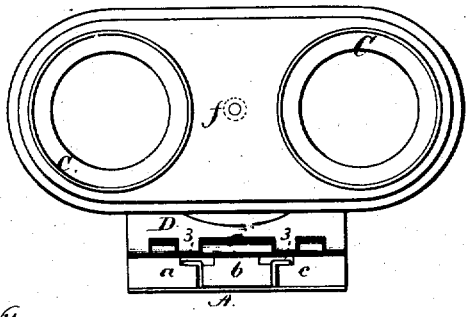
Figure 3:
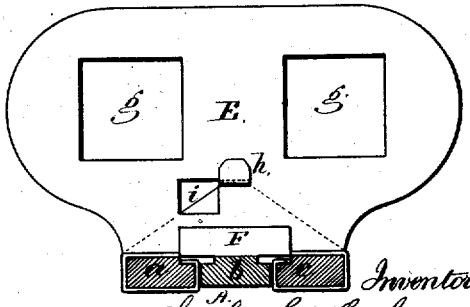

In the drawing, Figure 1 is a plan view of the stereoscope-instrument as open for use. Fig. 2 is a vertical section longitudinally of the same. Fig. 3 is an elevation of the field-piece or septum and section of the bed, and Fig. 4 is an elevation of the eyeglasses or lens-holder.

A represents the bed; B, the picture-holder; C, the lens-holder; D, the hinged head-piece, connecting the lens-holder and bed; E, the field-piece or septum, and F the movable holder for the same.

The picture-holder B is adapted to receive and retain the picture. It is shown as an angular bracket, with two springs extending in opposite directions to press against the front of the picture B′.

The bed A is shown as made of the three pieces *a b c*, and the picture-holder is attached to the center slide *b*; but the bed may be in one piece, and the picture-holder so arranged that it slides on it toward or from the lens-holder; but it is obvious that in order to be able to move the picture to the desired distance from the lenses, the bed has to be made twice as long, or nearly so, as it will be when provided with a slide, *b*, and ways *a c*.

When constructed in the manner shown the length of the bed-plate can be reduced, so that the whole can be stored in a small compass.

The movement of the picture-holder is allowed for by the sheet-metal connections with the bed. These are represented as made with lips 3 3, folded over the edges of the bed A, and serve to connect the moving parts of the picture-holder and bed, and retain the same in position by the frictional contact thus produced.

The head-piece D is connected to the bed *a* by a hinge, *d*, so that it may be folded down upon the bed A, or raised at right angles to said bed for supporting the lenses and holder when in use. A notched arm or spring-catch, *e*, serves to retain the head-piece in a vertical position.

In order to fold the instrument into a still smaller compass, the lens-holder is connected to the head-piece by a pivot, *f*, so that the same can be turned into line with the bed A.

Figs. 1 and 2 represent the parts as unfolded and in position for use, and pictures B′ are inserted successively into the picture-holder B, and adjusted to the proper focus for the picture and the observer.

The effect is considerably improved by confining the sight of each eye to its own picture. For this purpose the field-piece E is made with two openings, *g*, and it is movable toward or from the picture, to allow the whole of each picture to be seen, but to prevent any portion of the adjoining picture being seen through the wrong glass.

The septum or field-piece is upon a sliding holder, F, that can be moved back and forth upon the bed A; and the sliding holder F is made of sheet metal, cut and bent so that the same passes around the edges of the bed A, to support such holder and apply the necessary frictional contact to retain the holder F in any position to which it may be moved.

The septum or field-piece is represented as setting at its lower edge in a groove formed by the sheet metal, and there is also a hook,

*h*, to support the same, there being a hole, *i*, and slot to allow the septum to be put into place or disconnected from the holder F.

This instrument is exceedingly simple in its construction. It can be made cheaply, and adjusted with more facility than the costly or complicated instruments heretofore made.

What I claim as the invention of myself and JAMES A. BAZIN is—

1. In a stereoscope-instrument, the bed-piece A, in combination with the hinged lens-holder C and longitudinally-sliding picture-holder B, constructed and operating in the manner and for the purpose substantially as shown and described.

2. The longitudinally-adjustable field-piece or septum E, in combination with the bed-plate A, lens-holder C, and adjustable picture-holder B, substantially as and for the purposes set forth.

3. The lens-holder C, connected to the head-piece D by means of a pivot, *f*, substantially as and for the purpose described.

4. The spring-catch *e*, in combination with the hinged head-piece D, bed-plate A, and lens-holder C, constructed and operating as and for the purpose set forth.

5. The bed-piece formed of the bars *a b c*, in combination with a pair of stereoscopic lenses, substantially as and for the purpose herein set forth.

6. In a stereoscope-instrument, a holder and a bed upon which the holder is movable, in combination with the sheet-metal connecting-pieces that slide upon the bed, substantially as set forth.

7. The combination, in a stereoscope-instrument, of a movable lens-holder, a movable septum or field-piece, and a sliding picture-holder, whereby the stereoscope can be packed in a small compass, substantially as described.

8. In a stereoscope-instrument, the combination, with the bed A, of a movable holder, F, extending down at the sides of the bed and sliding upon the same, and retained in position by friction, substantially as set forth.

Signed by me this 28th day of January, A. D. 1878.

CHARLES H. WHEELER.

Witnesses:
WM. H. RULOFSON,
E. W. CROOK.